United States Patent

Ritter et al.

[11] 4,235,768
[45] Nov. 25, 1980

[54] PRODUCTION OF READILY DISPERSIBLE TITANIUM DIOXIDE PIGMENTS

[75] Inventors: Helmut Ritter; Heinz-Peter Hemmerich; Hans J. Rosenkranz, all of Krefeld, Fed. Rep. of Germany

[73] Assignee: Bayer Aktiengesellschaft, Leverkusen, Fed. Rep. of Germany

[21] Appl. No.: 70,477

[22] Filed: Aug. 28, 1979

[30] Foreign Application Priority Data

Sep. 19, 1978 [DE] Fed. Rep. of Germany ....... 2840637

[51] Int. Cl.² ............................ C09C 1/36; C09C 3/10
[52] U.S. Cl. ................................. 260/40 R; 106/300; 106/308 M; 106/308 Q; 260/42.14
[58] Field of Search .............. 106/300, 308 M, 308 Q; 260/40 R, 42.14

[56] References Cited

U.S. PATENT DOCUMENTS

| | | | |
|---|---|---|---|
| 3,642,510 | 2/1972 | Sugiyama et al. | 106/300 |
| 3,945,843 | 3/1976 | Holty et al. | 106/308 M |
| 3,963,512 | 6/1976 | Swift et al. | 106/308 M |
| 4,036,652 | 7/1977 | Rothmayer | 106/300 |
| 4,062,692 | 12/1977 | Hemmerich et al. | 106/308 M |

*Primary Examiner*—Helen M. McCarthy
*Attorney, Agent, or Firm*—Sprung, Felfe, Horn, Lynch & Kramer

[57] ABSTRACT

In the homogeneous coating of a titanium dioxide pigment with an organic polymer in which an aqueous solution of a polymer containing carboxyl groups is added to a dispersion of titanium dioxide in water, the polymer is applied to the pigment, the coated pigment is separated off from the aqueous medium, washed, dried and, optionally ground, the improvement which comprises employing as the polymer a polymer of the formula

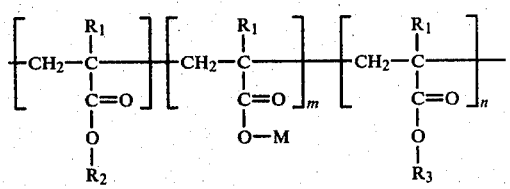

in which
  $R_1$ each independently is hydrogen or methyl,
  $R_2$ is hydrogen, or alkyl or cycloalkyl containing from 1 to 8 carbon atoms,
  M is sodium or potassium,
  $R_3$ is hydrogen, alkyl or cycloalkyl containing from 1 to 12 carbon atoms, or hydroxyalkyl containing from 2 to 6 carbon atoms,
  $m = 0.2$ to 1.5, and
  $n = 0$ to 0.5, the polymer being added to the titanium dioxide dispersion in the form of a weakly alkaline aqueous solution in about 0.05 to 2.5% by weight based on the titanium dioxide.

4 Claims, No Drawings

PRODUCTION OF READILY DISPERSIBLE TITANIUM DIOXIDE PIGMENTS

This invention relates to a process for the organic aftertreatment of titanium dioxide pigments for improving their dispersibility in organic binders.

The homogeneous dispersion of hydrophilic pigments in liquid organic media involves considerable difficulties, particularly when the surface of the solid particles is wetted only slightly, if at all, by the surrounding liquid. In the production of pigmented lacquers and plastic materials, the degree of dispersion is an important factor because it has a very considerable influence on the properties of the products in regard to hue, gloss and physical and chemical behavior. It is known that the surface of the pigments to be dispersed is wetted more effectively by coating with suitable organic substances and is distinguished by weaker intermolecular forces. However, the production of optimal pigment products presupposes the availability of organic materials which are capable of satisfying stringent requirements and which can be applied extremely uniformly to all the primary particles. Agglomeration of the primary particles, particularly during drying, does not always permit subsequent coating, for example by spraying, in the required homogeneity. German Offenlegungsschrift No. 1,814,569 describes a process in which an aqueous solution of a copolymer of styrene and maleic acid monoester is sprayed onto the titanium dioxide pigment while the material is being delivered to a mill. Apart from the fact that the styrene component, as experience has shown, can easily result in undesirable yellowing, humogeneous coating is difficult to obtain by this process. French Patent No. 1,427,492 describes a process for the production of pigment dispersions in which the material to be coated is stirred with an aqueous, dilute polymer solution, for example polyacrylates, to form a paste and subsequently dried. the disadvantage of this process is that evaporation of the water involves a fairly high consumption of energy. U.S.Pat. No. 3,642,510 describes the production of readily dispersible titanium dioxide pigments by adding solutions of high molecular weight carboxylate compounds to a titanium dioxide suspension and fixing these carboxylate compounds on the surface of the titanium dioxide particles by means of aluminum or zinc salts. Although this process enables the titanium dioxide particles to be coated relatively uniformly, the expense which it involves is considerable due to the use of organic solvents.

An object of the present invention is to provide titanium dioxide pigments with good dispersion and optical properties by a process which, in particular, largely elimates emission and effluent problems caused by organic solvents andd by incomplete application of the organic aftertreatment agents and which avoids expensive process steps.

Accordingly, the present invention provides a process for homogeneously coating titanium dioxide pigments with organic polymers in which an aqueous solution of a polymer containing carboxyl groups is added to a dispersion of titanium dioxide in water and the polymer is applied to the pigment, after which the coated pigment is separated off from the aqueous medium, washed, dried and, optionally, ground in known manner, characterized in that polymeric compounds corresponding to the general formula:

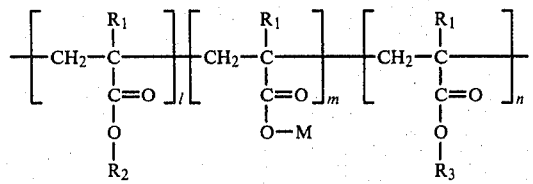

in which $R_1$ independently of one another represent hydrogen or methyl;

$R_2$ represents hydrogen, alkyl or cycloalkyl containing from 1 to 8 carbon atoms;

M represents sodium or potassium ions;

$R_3$ is hydrogen, alkyl or cycloalkyl containing from 1–12 carbon atoms, or hydroxyalkyl containing from 2 to 6 carbon atoms;

$l = 1$ part;

$m = 0.2$ to 1.5 parts; and $n = 0$ to 0.5, are added as polymeric compounds to the titanium dioxide suspension in the form of a weakly alkaline aqueous solution in quantities of from about 0.05 to 2.5% by weight and preferably in quantities of about 0.2 to 0.8% by weight, based on the titanium dioxide.

The polymers used in accordance with the invention are produced by known methods in bulk, in organic solvents, or, preferably, by known emulsion polymerization processes in aqueous medium using micell formers, such as alkyl sulphonates, and radical initiators, such as for example $K_2S_2O_8$ or the redox system $K_2S_2O_8/NaHSO_3$ at temeratures in the range of about 40 to 80° C and preferably at temperatures in the range of about 40 to 80° C. To regulate molecular weight, known compounds, such as for example tertiary dodecyl mercaptan or allyl alcohol, are added in quantities of up to about 5% by weight. The molecular weights of the resulting polymers are in the range of from about 500 to 100,000, depending on the amount of regulator used, although it is preferred to use polymers having a molecular weight in the range of from about 10,000 to 30,000. The emulsion polymer has a solids content of from about 10 to 40% by weight and preferably from about 20 to 25% by weight, depending on the quantity of monomer introduced. After dilution with water to a volume of from about 2- to 5-fold and pH-adjustment to a value of from about 8 to 13 and preferably to value of about 10 to 12 by the addition of potassium or sodium hydroxide, a pourable aqueous solution of the polymer is obtained and may be directly used for treating the pigments.

According to the invention, particularly preferred aftertreatment compounds are those in which $R_2$ in the general formula is an alkyl radical containing from 1 to about 6 carbon atoms, while $R_3$ is an alkyl radical containing 1 to 12 carbon atoms or a hydroxyalkyl radical containing 2 or 3 carbon atoms. A standard, commercially available ethoxylated or propoxylated (meth)acrylic acid is used as the third monomer component characterized by the letter "n" in the general formula. A copolymer of butyl acrylate (50 to 80% by weight) and methacrylic acid (50 to 20% by weight) is particularly suitable.

By dispering the titanium dioxide pigment to be treated in water, a homogeneous pulp, in which the titanium dioxide particles are present in fairly finely divided form, is obtained during stirring. The solids content of the pulp may be adjusted to between about 10 and 60% by weight and is preferably adjusted to between about 15 and 30% by weight. The aqueous solution of the polymer is slowly added to the titanium dioxide dispersion. The polymer content, based on the titanium dioxide, is about 0.05 to 2.5% by weight and is preferably about 0.2 to 0.8% by weight, especially preferably about 0.3 to 0.5% by weight.

After filtration and intensive washing with desalted water the product is dried in the usual way at about 150° to 230° C. and preferably delivered to a steam mill. The pigment products obtained by the process according to the invention can be dispersed very easily in organic binders and show very good optical properties.

The process according to the invention is illustrated in the following examples:

(1) PRODUCTION OF THE ORGANIC AFTERTREATMENT SUBSTANCES (a) 0.8 g of $NaHSO_3$ (40% aqueous solution) and 1,5 g of $C_{18}$-alkyl sulphonate are introduced into 250 ml of water. A mixture of 25 g of methacrylic acid, 55 g of butyl acrylate and 20 g of 2-hydroxypropyl methacrylate is then slowly added dropwise over a period of 1 to 2 hours at 40° C. in the absence of oxygen. At the same time a solution of 0.5 g of $K_2S_2O_8$ in 50 ml of water is added in portions over a period of about 2 hours. On completion of polymerization, a latex having a solids content of 25% is obtained. A viscous solution is formed by addition of dilute sodium hydroxide.

(b) 0.8 g of $NaHSO_3$ (40% aqueous solution), 1 g of alkyl sulphonate and 0.3 g od dodecyl mercaptan are introduced into 250 ml of water. A monomer mixture of 30 g of methacrylic acid and 70 g of butyl acrylate is then slowly added dropwise under nitrogen. At the same time, 0.5 g of $K_2S_2O_8$ in 100 ml of water is added in portions. The solids content of the alkali-soluble latex is 21%.

(c) A monomer mixture of 30 g of methacrylic acid and 70 g of methacrylic acid methyl ester is polymerized in the aqueous phase in the same way as in 1 (b). The resulting polymer is soluble in alkaline aqueous medium.

(d) 1 g of alkyl sulfonate and 0.6 g of tertiary dodecyl mercaptan are introduced into 250 ml of water. A monomer mixture of 40 g of methacrylic acid and 60 g of butyl acrylate is then added dropwise under nitroge. At the same time, 0,5 g of $K_2S_2O_8$ in 100 ml of water is added in portions. The solids content after the polymerization is 22%.

(2) PIGMENT AFTERTREATMENT (a) 100 g of $TiO_2$ pigment which has been subjected to the usual inorganic aftertreatment with $Al_2O_3$ or $SiO_2$ are made into a pulp with 400 ml of water. The pH value amounts to approximately 6±0.5. Thereafter, 1,4 g of the latex of Example 1 (b) are dissolved in a little dilute sodium hydroxide (pH approximately 10 to 12) and the resulting solution is slowly added dropwise with stirring to the $TiO_2$ pulp. The mixture is then stirred for about 10 minutes, filtered, washed with 1.5 liters of hot water (approximately 60° to 85° C.) and, finally, dried and ground. The treated pigment has a C-content of 0.21%.

(b) A polymer of 40% of methacrylic acid and 60% of butyl acrylate produced in accordance with the invention (see Example 1 (b)) is precipitated onto $TiO_2$ pigment in a quantity of 0.30%, based on $TiO_2$ solids, in accordance with Example 2 (a). After washing and drying, a C-content of 0,2% is observed by elemental analysis, i.e. the polymer adheres substantially quantitatively to the $TiO_2$ surface.

(c) In accordance with Example 2 (a) 0.45% by weight of the polymer of methacrylic acid and methyl methacrylate (see Example 1 (c)) is quantitatively precipitated onto $TiO_2$.

(d) The polymer of methacrylic acid and methyl methacrylate (see Example 1 (d)) is precipitated onto $TiO_2$ pigment in a quantity of 0.33% by weight in accordance with Example 2 (a).

(e) The $TiO_2$ samples produced in accordance with Example 2 (a) and (b) are ground under the same conditions in a steam mill and tested in lacquer binders. A $TiO_2$-product which has not been treated with organic-material is used for comparison.

TESTING OF THE PIGMENTS

The granularity of the pigments produced by the process according to the invention is tested by means of a grindometer according to DIN 53 238 or DIN 53 203 (ASTM D-1210). A standard, commercially available middleoil alkyd resin is used as the organic medium. The gloss of the pigmented films is determined by means of a reflectometer according to DIN 67 530 (ASTM D-523). Relatively scattering power if determined by the black ground process according to DIN 53 164.

Results obtained are set out in Table 1:

Table 1

| Treated material (%) | Dispersion value 5' | Dispersion value 10' | Gloss 20° | Lightness $R_y$ | Yellow tinge $R_x$-$R_z$ |
|---|---|---|---|---|---|
| Comparison sample (0) | 60 | 60 | 38 | 87.2 | 1.9 |
| Polymer of Example 1(a) (0.36) | 25 | 20 | 68 | 88.0 | 1.0 |
| Polymer of Example 1(b) (0.30) | 10 | 10 | 68 | 87.2 | 1.5 |
| Polymer of Example 1(c) (0.45) | 10 | 10 | 69 | 88.6 | 1.4 |
| Polymer of Example 1(d) (0.33) | 10 | 10 | 72 | 89.1 | 1.5 |

As is to be seen from Table 1 the $TiO_2$ pigment coated with polymers exhibits lower dispersion values (μm) and a better gloss compared with the comparison sample. Both units of measurement indicate a high degree of dispersion of the $TiO_2$ particles in the binding material.

What we claim is:

1. In the homogeneous coating of a titanium dioxide pigment with an organic polymer in which an aqueous solution of a polymer containing carboxyl groups is added to a dispersion of titanium dioxide in water, the polymer is applied to the pigment, the coated pigment is separated off from the aqueous medium, washed, dried and, optionally, ground, the improvement which comprises employing as the polymer a polymer of the formula

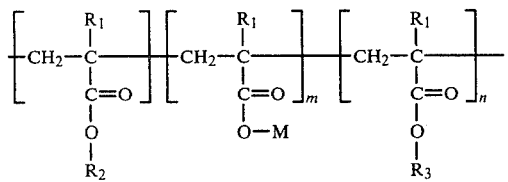

in which

R₁ each independently is hydrogen or methyl,

R₂ is hydrogen, or alkyl or cycloalkyl containing from 1 to 8 carbon atoms,

M is sodium or potassium,

R₃ is hydrogen, alkyl or cycloalkyl containing from 1 to 12 carbon atoms, or hydroxyalkyl containing from 2 to 6 carbon atoms, m=0.2 to 1.5, and n=0 to 0.5, the polymer being added to the titanium dioxide dispersion in the form of a weakly alkaline aqueous solution in about 0.05 to 2.5% by weight based on the titanium dioxide.

2. A process according to claim 1, wherein the polymer is added in about 0.2 to 0.8% by weight based on the titanium dioxide.

3. A coated titanium dioxide pigment produced by the process of claim 1.

4. A pigment according to claim 3 in a solid organic binder.

* * * * *